Sept. 27, 1932.    J. B. J. A. VIGNERON    1,880,059
TOWING DEVICE FOR TRAWL NETS
Filed June 12, 1931
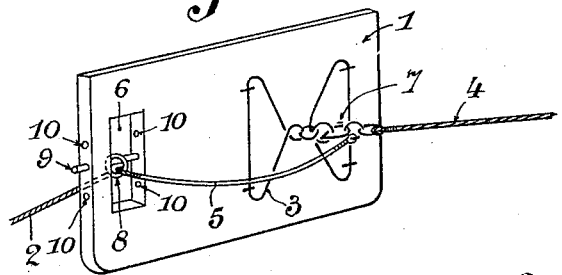
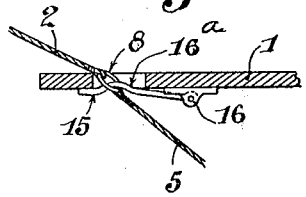
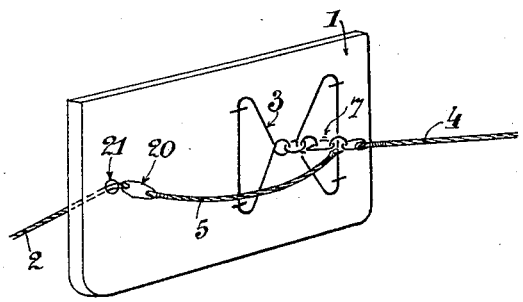
INVENTOR:
JEAN BAPTISTE JOSEPH ALPHONSE VIGNERON
BY:
ATTORNEYS Patented Sept. 27, 1932

1,880,059

UNITED STATES PATENT OFFICE

JEAN-BAPTISTE JOSEPH ALPHONSE VIGNERON, OF LA ROCHELLE, FRANCE, ASSIGNOR TO V. D. LIMITED, OF LONDON, ENGLAND

TOWING DEVICE FOR TRAWL NETS

Application filed June 12, 1931, Serial No. 543,839, and in France June 26, 1930.

The present invention relates to devices for connecting the shear boards of trawling gears of the V. D. type with the net cables and tow hawsers in such manner as to facilitate the disconnection of the shear boards in order to haul the net on board and to facilitate the attachment of the shear boards for launching the gear at sea. The invention relates more particularly to the devices described in the prior U. S. Patents 1,553,754 dated September 15, 1925, 1,582,641 dated April 27, 1925 and 1,601,893 dated October 5, 1926.

One object of the invention is to simplify the construction and to devise an arrangement whereby the cables are less liable to become entangled, whereby the shear board more readily assumes its correct position when launched at sea and reaching the sea bottom.

Figs. 1 to 3 show, by way of example, various embodiments of the invention.

Referring to Figure 1, 1 denotes a shear board connected with a towing line or net cable 2 and adapted to secure the opening of a trawl net in width. Shear board 1 carries the usual brackets 3 connected with the boat by the tow hawser 4.

The net cable 2 is connected with the tow hawser 4 by an intermediate cable of pennant 5, extending through an opening 6 of the shear board; the attaching point of cables 4 and 5 is connected by a shackle 7 to the apex of the brackets, while the attaching point of cables 2 and 5 comprises a ring 8 through which may be inserted a pin 9, secured in a detachable manner to shear board 1. Said pin may be introduced for example through a hole provided in the thickness of the shear board and opening into the aperture 6 of the latter. Preferably, the pennant has a length greater than the distance of the opening 6 to the apex of the brackets, in such manner as to be relieved from the traction stresses during the fishing operation, when pin 9 extends through ring 8 and when shackle 7 is attached to the brackets. When the net is hauled on board, shackle 7 is detached, pin 9 is removed and pennant 5 and net cable 2 are wound on the boat winch, following the tow hawser 4, net cable 2 running through the opening 6.

As shown, several holes 10 may be arranged in superposed relation so as to adjust the height of pin 9 relatively to the shear board.

In Figure 2, the ring 8, which connects the net cable 2 with the pennant 5, engages a lock member 15, pivoted at 16 on the shear board 1. During the fishing operation, ring 8, drawn by cable 2 (pennant 5 being sufficiently slack), presses on lock member 15, which, for this purpose, may be provided with a curved portion 16a. When the net is hauled on board, shackle 7 is detached, as in Fig. 1, and ring 8, drawn by pennant 5, turns lock member 15 about its pivot pin 16, whereby the ring 8 is disengaged automatically.

In Fig. 3, the net cable 2 and the pennant 5 are provided at their attaching point with a stop member 20 and the opening 21 provided in the shear board is sufficiently large to allow the free passage of cable 2, but is small enough to prevent passage of stop member 20. During the fishing operation, the stop member abuts against the shear board under the effect of the traction exercised by cables 2; when hauling the net on board, and upon removal of shackle 7, cable 5 is wound on the winch, while cable 2 slides through the opening 21 of the shear board.

Due to the arrangement of the connecting means 8, 9 (Fig. 1), 8, 15 (Fig. 2) or 20—21 (Fig. 3) in the plane and within the area of the shear board, the usual crow foot which was provided in the prior specifications 1,553,754 and 1,601,893 above referred to may be dispensed with, thus materially simplifying the construction and operation. Moreover, inasmuch as a single cable 2 extends from the rear end of the shear board, no entangling of the cables is to be feared, whereby the shear board assumes more surely its proper vertical position when reaching the sea bottom.

Obviously, the invention is not strictly limited to the above described embodiments, which have been indicated solely by way of example.

Having now described my invention what

I claim is new and desire to secure by Letters Patent is:

1. A towing device for trawl nets comprising a towing line connected to one of the net wings, an otter board, a tow hawser connected to the boat, means for detachably connecting the tow hawser to the inner face of said board, means situated in the plane and within the area of said board for detachably connecting the towing line to said board, and an intermediate cable portion connecting said towing line with said hawser.

2. A towing device for trawl nets comprising a towing line connected to one of the net wings, an otter board, a tow hawser connected to the boat, means for detachably connecting the tow hawser to the inner face of said board, an aperture in said board, said towing line extending therethrough and being connected with said tow hawser, a ring secured to said towing line adjacent said aperture and means movably supported by said board, extending through said ring and across said aperture.

3. A towing device for trawl nets comprising a towing line connected to one of the net wings, an otter board, a tow hawser connected to the boat, means for detachably connecting the tow hawser to the inner face of said board, an aperture in said board, said towing line extending therethrough and being connected with said tow hawser, a ring secured to said towing line adjacent said aperture and a pin removably engaging a hole in said board and extending through said ring and across said aperture.

4. A towing device for trawl nets comprising a towing line connected to one of the net wings, an otter board, a tow hawser connected to the boat, means for detachably connecting the tow hawser to the inner face of said board, an aperture in said board, said towing line extending therethrough and being connected with said tow hawser, a ring secured to said towing line adjacent said aperture and a lock member freely pivoted to the inner face of said board and extending through said ring and across said aperture.

5. A towing device for trawl nets comprising a towing line connected to one of the net wings, an otter board, a tow hawser connected to the boat, means for detachably connecting the tow hawser to the inner face of said board, an aperture in said board, said towing line extending freely therethrough and being connected with said tow hawser, and a stop member on said towing line, on the inner side of said board and of such size as to be prevented from passing through said aperture.

In testimony whereof I have signed my name to this specification.

JEAN-BAPTISTE JOSEPH ALPHONSE VIGNERON.